(12) United States Patent
Wipf et al.

(10) Patent No.: US 8,141,503 B2
(45) Date of Patent: Mar. 27, 2012

(54) METHOD AND APPARATUS FOR IMPROVING AIR SEEDER BOOT

(75) Inventors: Danny Wipf, Lake Andes, SD (US); Joseph Hofer, Lake Andes, SD (US)

(73) Assignee: Lakeview Hutterian Brethren, Lake Andes, SD (US)

( * ) Notice: Subject to any disclaimer, the term of this patent is extended or adjusted under 35 U.S.C. 154(b) by 0 days.

(21) Appl. No.: 12/476,361

(22) Filed: Jun. 2, 2009

(65) Prior Publication Data

US 2010/0300337 A1  Dec. 2, 2010

(51) Int. Cl.
*A01C 7/00* (2006.01)
*A01C 9/00* (2006.01)
*F16B 9/00* (2006.01)
*F16C 11/06* (2006.01)
*F16J 1/16* (2006.01)

(52) U.S. Cl. .......... 111/174; 403/71; 403/156; 403/162; 403/253; 403/258; 403/259; 403/260; 403/262; 403/335; 403/338; 403/388

(58) Field of Classification Search .............. 403/71, 403/152, 154, 155, 162, 163, 165, 156, 161, 403/164, 230, 247, 256–260, 262, 335, 338, 403/384, 388; 111/174, 170
See application file for complete search history.

(56) References Cited

U.S. PATENT DOCUMENTS 704,321 A * 7/1902 Greenwood ............... 403/154
2,422,327 A * 6/1947 Winslow ................... 403/152

* cited by examiner

*Primary Examiner* — Christopher J. Novosad
(74) *Attorney, Agent, or Firm* — Jeffrey A. Proehl; Woods, Fuller, Shultz & Smith, PC

(57) ABSTRACT

In an air seeder assembly having a base mount member with a at least one base ear with a base bore, and a seed boot with at least one boot ear with a boot bore, a fastening assembly mounting the seed boot to the base mount member is disclosed. The fastening assembly comprises a fastener structure fastening the seed boot to the base mount member by extending through the base bore and the boot bore. The fastening assembly includes a fastener interface device inserted into at least one of the bores. The interface device comprises a substantially tubular insertion portion inserted into the at least one bore and a flange portion connected to the insertion portion, and extends radially outwardly from the insertion portion.

20 Claims, 3 Drawing Sheets

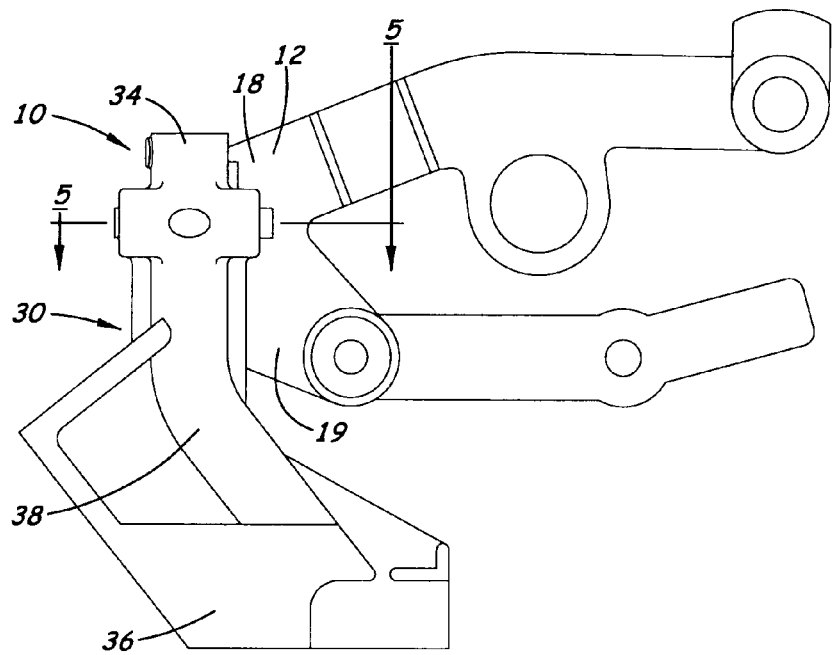
Fig. 2
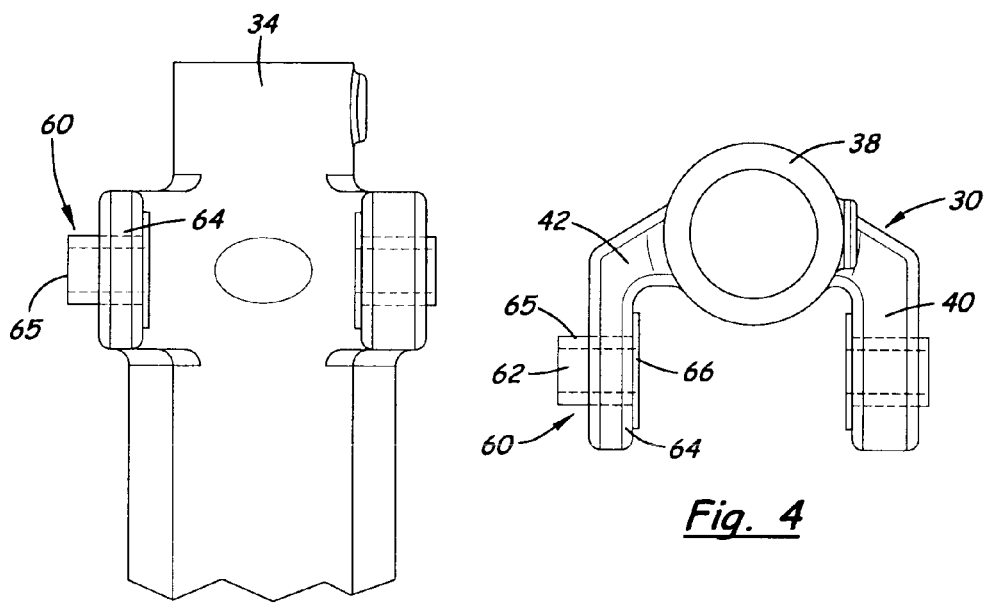
Fig. 3
Fig. 4

METHOD AND APPARATUS FOR IMPROVING AIR SEEDER BOOT

BACKGROUND

1. Field

The present disclosure relates to air seeder boots and more particularly pertains to a new method and apparatus for improving an air seeder boot to provide greater durability to the mounting of the air seeder boot on the air seeder apparatus.

2. Description of the Prior Art

Air seeder apparatus are used to move seed for planting from a bin of seeds to a furrow formed in the ground for the purpose of planting the seed for growing crop. The air seeder apparatus includes a seed boot for each row that the air seeder apparatus is capable of planting in one pass of the apparatus across the field. The seed boot includes a passage or channel through which the seed is moved from the seed supply container to the furrow. The bottom end of the seed boot is positioned in close proximity to the ground and the furrow, and is subject to contact with the ground that places stress on the structure mounting the boot to the base mount of the apparatus. The seed boot may be connected to the base mount by a pin, such as a bolt fastener, that passes through ears or tabs that extend from the base mount and the seed boot. The fastener passes through holes in the ears to hold the boot to the base mount, with some degree of pivot movement of the boot being possible. FIG. 1 of the drawings provides an illustration of the prior structure.

Due to the forces applied to the boot by contact with the ground, the mount is subject to significant wear over a planting season. The seed boot may be easily removed from and replaced on the air seeder apparatus, but this can be expensive, and rebuilding the mount structure on the main seeder apparatus is not as easily accomplished and thus presents a greater challenge.

SUMMARY

In view of the foregoing, the present disclosure describes a new method and apparatus for improving air seeder boot which may be utilized to provide greater durability to the mounting of the air seeder boot on the air seeder apparatus.

In one aspect, the present disclosure relates, in an air seeder assembly having a base mount member with a body and a pair of base ears extending from the body and each having a base bore, and a seed boot with a conduit portion and a pair of boot ears extending from the conduit portion and each having a boot bore, a fastening assembly mounting the seed boot to the base mount member. The fastening assembly comprises a fastener structure fastening the seed boot to the base mount member, with the fastener structure extending through the base bore of each base ear and the boot bore of each boot ear. The fastening assembly comprises a fastener interface device positioned between the fastener structure and seed boot, with the fastener interface device being inserted into at least one bore of the base bores and the boot bores. The fastener interface device comprises a substantially tubular insertion portion inserted into the at least one bore and a flange portion connected to the insertion portion and extending radially outwardly from the insertion portion such that the flange portion is interposed between one of the base ears and one of the boot ears.

In another aspect, an air seeder assembly is disclosed that comprises a base mount member having a body and at least one base ear extending from the body, the base ear having a base bore formed therethrough. The assembly further includes a seed boot defining a passage through which a seed moves. The seed boot comprises a conduit portion defining the passage and at least one boot ear extending from the conduit portion. The at least one boot ear is positioned adjacent to the at least one base ear of the base mount member. The at least one boot ear has a boot bore extending therethrough and aligned with the base bore. The assembly further includes a fastener structure extending through the base bore of the at least one base ear and the boot bore of the at least one boot ear to fasten the seed boot to the base mount member. The assembly further includes a fastener interface device positioned between the fastener structure and one of the ears, and the fastener interface device is inserted into at least one of the bores of the base bores and the boot bores.

In still another aspect, the disclosure relates a method of reducing wear on an air seeder assembly. The method comprises providing an air seeder assembly having a base mount member with a body and a pair of base ears extending from the body and each having a base bore, and a seed boot with a conduit portion and a pair of boot ears extending from the conduit portion. The method further comprises providing a fastener interface device comprising a substantially tubular insertion portion and a flange portion connected to the insertion portion and extending radially outwardly from the insertion portion. Still further, the method includes inserting the fastener interface device in at least one of the bores by inserting the insertion portion of the interface device into the at least one bore. The method also includes extending the fastener structure through the fastener interface device to secure the seed boot to the base mount member.

There has thus been outlined, rather broadly, some of the more important elements of the invention in order that the detailed description thereof that follows may be better understood, and in order that the present contribution to the art may be better appreciated. There are additional elements of the invention that will be described hereinafter and which will form the subject matter of the claims appended hereto.

In this respect, before explaining at least one embodiment or implementation in greater detail, it is to be understood that the scope of the invention is not limited in its application to the details of construction and to the arrangements of the components, and particulars of the steps of the method, set forth in the following description or illustrated in the drawings. The invention is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present invention.

The advantages of the various embodiments of the present invention, along with the various features of novelty that characterize the invention, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 2 is a schematic side view of a new apparatus for improving an air seeder boot according to the present disclosure mounted on an air seeder boot and base member of the air seeder apparatus.

FIG. 3 is a schematic side view of the air seeder boot with the apparatus of the present disclosure, according to an illustrative embodiment.

FIG. 4 is a schematic top view of the air seeder boot with the apparatus of the present disclosure, according to an illustrative embodiment.

DETAILED DESCRIPTION

Figure 1:
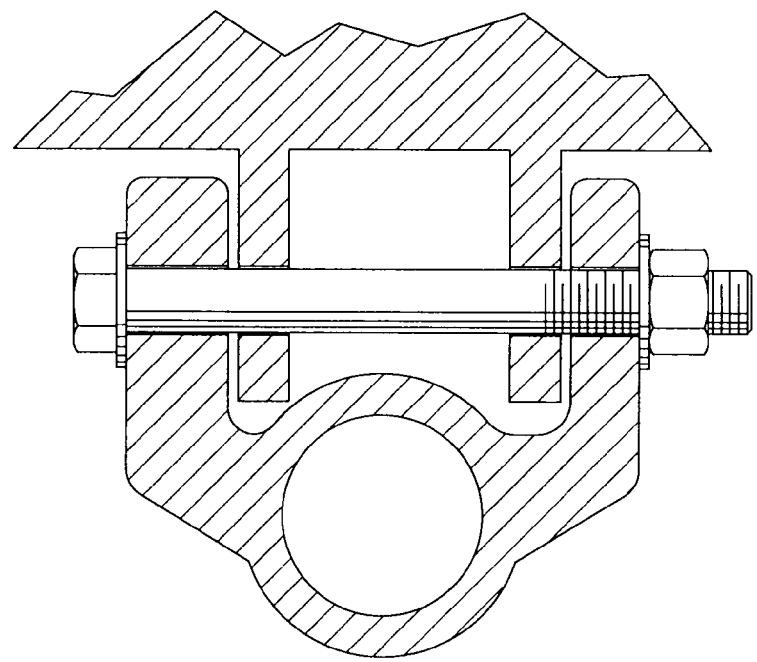
FIG. 1 is a schematic sectional view of an air seeder boot and base member of the air seeder apparatus without the apparatus of the present disclosure.
Figure 5:
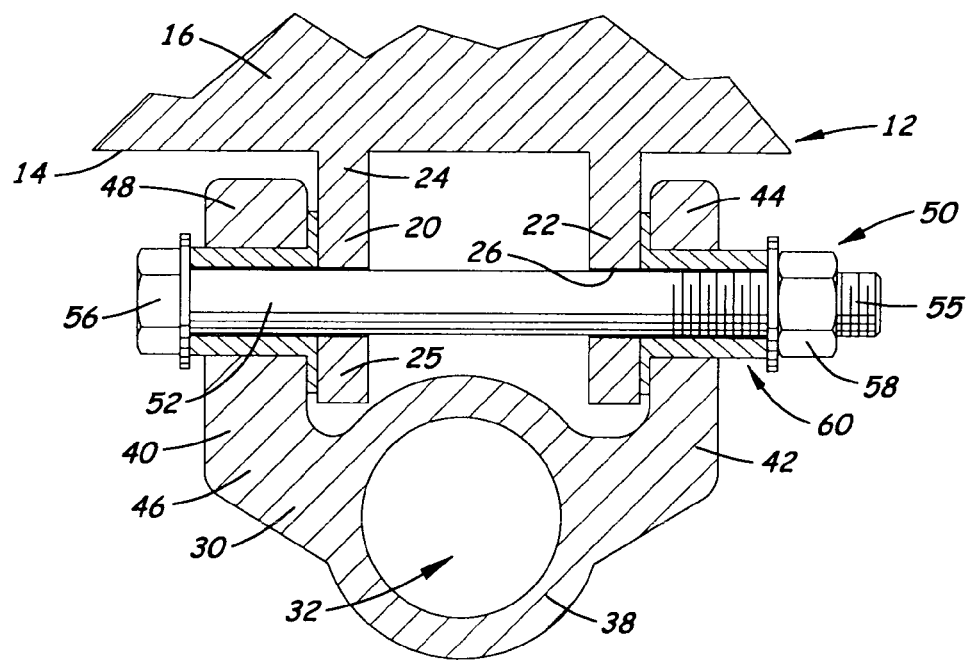
FIG. 5 is a schematic sectional view of the air seeder boot and base member of the air seeder apparatus with the apparatus according to an illustrative embodiment of the disclosure.
Figure 6:
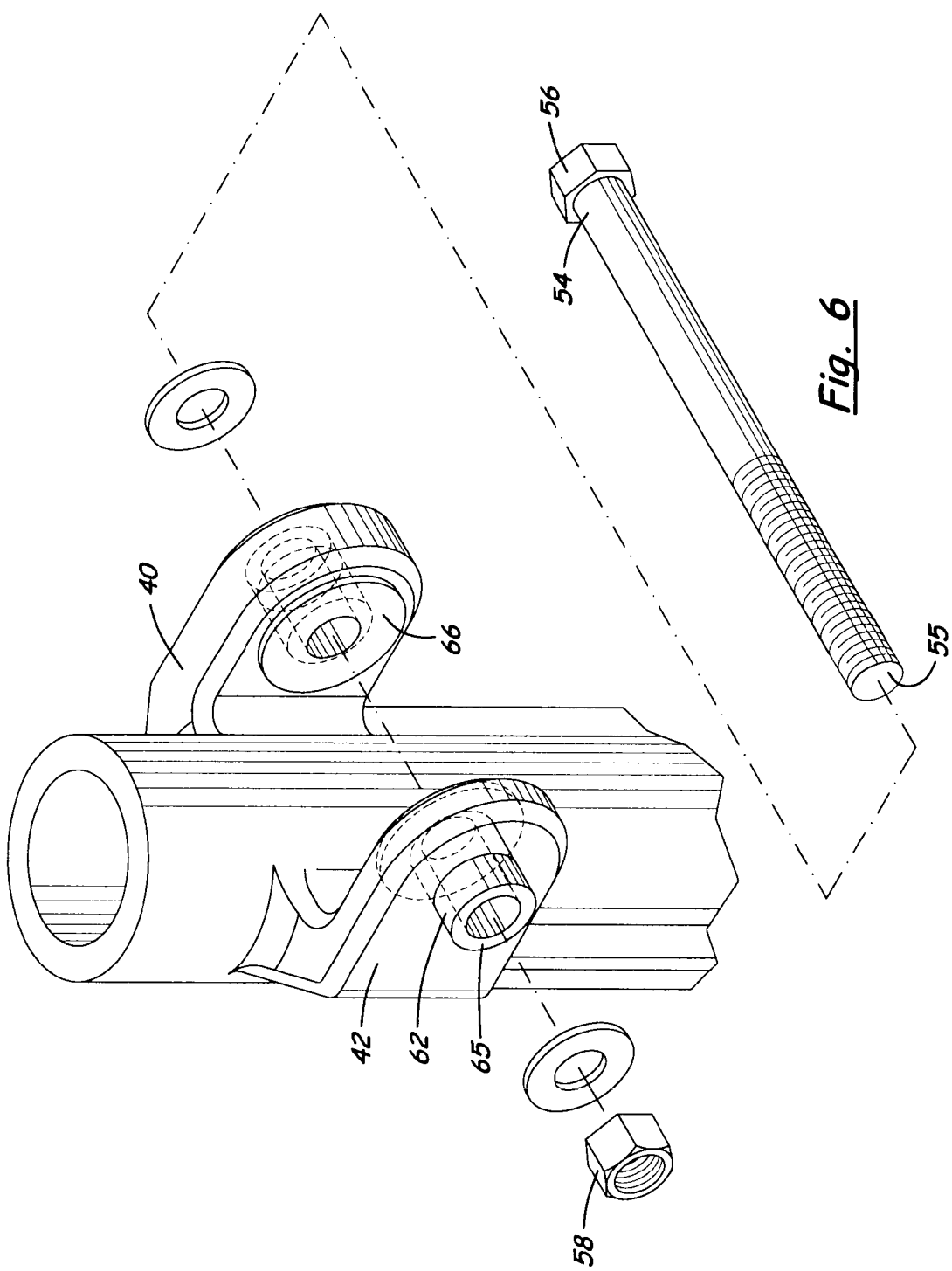
FIG. 6 is a schematic exploded perspective view of the air seeder boot and the apparatus of the disclosure.

With reference now to the drawings, and in particular to FIGS. 2 through 6 thereof, a new method and apparatus for improving air seeder boot embodying the principles and concepts of the disclosed subject matter will be described.

An air seeder boot assembly 10 suitable for the application of the aspects of the present disclosure is shown in FIGS. 2 through 6, and particularly in FIG. 2, although it should be recognized that while the description herein is made with respect to this air seeder apparatus structure, the invention may be applied to other air seeder apparatus configurations.

The air seeder apparatus 10 may include a base mount member 12 which may have virtually any configuration, and may include the following elements in addition to other elements that will not be described here. The base mount member 12 may have a side face 14 that is oriented toward the seed boot. The base mount member 12 may include a body 16 that includes the side face 18. The body 16 has an upper region 18 and a lower region 19. The base mount member 12 may further include a pair of base ears 20, 22 that extend from the body 16. The base ears 20, 22 may be mounted on the upper region 18 of the body. The base ears 20, 22 may extend from the side face 14 of the body, and may be spaced from each other such that a gap is formed therebetween. At least a portion of the base ears 20, 22 may be oriented substantially parallel to each other, although this is not critical. Each of the base ears may have a root end 24 and a free end 25, and the root end 24 may be fixed to the body 16. At least one, and typically each, of the base ears has a base bore 26 extending therethrough. The base bores 26 of the respective base ears 20, 22 may be axially aligned such that a fastener is able to pass through both bores simultaneously. The base bores 26 may be positioned toward the free ends 25 of the respective base ears.

The air seeder apparatus 10 may also include a seed boot 30 that defines a passage 32 through which a seed moves when the seed is being planted by the apparatus 10. The seed boot 30 has an upper end 34 and a lower end 36, and the passage 32 may extend from the upper end of the seed boot toward the lower end. Apparatus which guides the seed to the passage at the upper end of the boot has been omitted from the drawings for clarity, but are known to those skilled in the art. The seed boot 30 may comprise a conduit portion 38 that forms the passage 32. The conduit portion 34 may extend from the upper end 34 of the seed boot toward the lower end 36.

The seed boot 30 further includes at least one, and typically a pair of, boot ears 40, 42 that extend from the conduit portion 38. The boot ears 40, 42 may be configured and arranged such that each of the boot ears may be positioned adjacent to one of the base ears 20, 22 of the base mount member 12, and in some embodiments the boot ears may be configured so as to be positionable on the outside of the base ears of the base mount assembly, although this positioning is not critical. The pair of boot ears 40, 42 may be spaced from each other, and may be oriented substantially parallel to each other. Each of the boot ears 40, 42 may have a boot bore 44 that extends therethrough the ear. The boot bores 40, 42 of the pair of boot ears may be axially aligned such that a fastener is able to pass through each of the boot bores simultaneously. Each of the boot ears may have an inboard end 46 and an outboard end 48. The inboard ends 46 of the boot ears may be connected to the conduit portion 38 of the seed boot 30, and the boot bores 44 may be located toward the outboard ends 48 of the respective boot ears 40, 42.

The apparatus 10 may also include a fastener structure 50 to fasten the seed boot 30 to the base mount member 12. The fastener structure 50 may be removable to permit the seed boot 30 to be removed from the base mount member 12 after the fastener structure has been employed to mount the seed boot on the base mount member. The fastener structure 50 may extend through the base bores 26 of the base ears 20, 22 and the boot bores 44 of the boot ears 40, 42. The fastener structure 50 may permit a degree of pivoting of the seed boot 30 with respect to the base mount member 12, although this is not critical to the invention.

In the illustrative embodiments, the fastener structure 50 comprises a bolt 52 having a head end 54 and a thread end 55, and a head 56 may be located on the head end 54. A portion of the bolt 52 toward the thread end 55 may be threaded. When the fastener structure 50 is securing the boot 30 to the base mount member 12, the shaft of the bolt 52 extends through one or more of the base bores 26 and one or more of the boot bores 44 to secure the boot ears to the base ears. The fastener structure 50 may also include a nut 58 that is threadedly mounted on the bolt 52, and the nut is removably mounted on the thread end 55 of the bolt 52. Those skilled in the art will recognize that the fastener structure may comprise fasteners that are different from the bolt and nut arrangement set forth above.

The apparatus 10 of the disclosure may also include a fastener interface device 60 that is positioned between the fastener structure 50 and one or both of the base mount member 12 and the seed boot 30, and may eliminate or substantially eliminate direct contact between one or more of the ears and the fastener structure 50 when the interface device 60 is installed for use. The fastener interface device 60, when installed, may permit pivoting of the seed boot 30 with respect to the base mount member 12, although this is not critical to the functionality of the invention. The fastener interface device 60 may be inserted into at least one of the bores of the base bores 26 and the boot bores 44, and could be inserted into both bores of paired base ears and boot ears. Illustratively, the fastener interface device 60 may be inserted into one of the boot bores 44, and may not be inserted into the base bore of the base ear associated with the boot ear having the boot bore. In some preferred embodiments, a pair of the fastener interface devices 60 is employed, with each device 60 being inserted into one of the boot bores 44 or one of the base bores. For the purpose of the description, the fastener interface devices will be described as being inserted in the boot bores, with the understanding that the interface devices may alternatively or additionally be inserted into the base bores.

Each fastener interface device 60 may comprise an insertion portion 62 for insertion into at least one bore of the base and boot ear. The insertion portion 62 may be generally tubular in configuration, and may be substantially cylindrical. The insertion portion 62 may define a channel or passage for the fastener structure 50 to extend through when the fastener interface device 60 is in use. The insertion portion 62 has a first end 64 and a second end 65. Each fastener interface device may further comprise a flange portion 66 for positioning adjacent to one of the ears 20, 22 of the base mount member 12 and one of the ears 40, 42 of the seed boot. The flange portion 66 may be connected to the insertion portion 62 and may be connected to the first end 64 of the insertion portion. The flange portion 66 may extend radially outwardly from the insertion portion, and may be annular in configuration. The flange portion 66 may be interposed between one of the base ears and one of the boot ears of the paired base and boot ears when the interface device 60 is mounted on the base mount member 12 and the boot 30 for use.

The disclosure also relates to a method of improving or enhancing the mounting of an air seeder seed boot 30 on a base mount member 12. The method may comprise providing various elements of the air seeder apparatus 10 as set forth in this disclosure, and may include, for example, a base mount member having a pair of base ears and base bores through the ears, and a seed boot with a pair of base ears and boot bores through the ears, as well as a fastener structure extending through the bores. The method may further comprise providing a fastener interface device 60 which may include the insertion portion 62 and the flange portion 66. Another aspect of the method may be the step of removing the fastener structure 50 from the base bores 26 of the base mount member and the boot bores 44 of the seed boot, if the fastener structure is already positioned in the bores. If the fastener structure is not positioned in the bores, then the step of removal may be omitted.

Significantly, the method may also include the step of increasing a diameter of at least one of the bores, which may include increasing a diameter of at least one of the boot bores 26 in the boot, and may be applied to each boot bore of the pair of boot bores. Typically, the bore prior to this step will have a diameter size that is close to, but slightly larger than, the diameter size of the shaft of the fastener, so that the fastener passes through the bore relatively easily but the head of the fastener is not able to pass through the bore. It should be recognized that this step may include the forming of a bore in the ear where no bore was previously present, and making the bore larger than would be needed to fit the diameter size of the fastener.

In some implementations of the method, the step of increasing the diameter comprises drilling a drill bit into the boot ears, which may be accomplished by the drill bit having a diameter greater than the diameter of the boot bore prior to increasing the diameter by, for example, drilling. For example, the diameter of the boot bore may be approximately 3/8 inch prior to the increase of the diameter, and may be increased to a diameter of approximately 5/8 inch. Other diameters and other increments of increase in the diameter may be used. The increase in the diameter of the bore tends to increase the bearing surface, which will help reduce wear on the surface of the bore.

The method may further include the step of inserting a fastener interface device 60 in at least one bore of the base bore 26 and the boot bore 44, and may include inserting the insertion portion 62 of the fastener interface device 60 into one of the bores. In some preferred implementations, the insertion portion is inserted into the boot bore 26, with one of the interface devices 60 being inserted into each of the bores of the boot ears. Significantly, the interface device 60 serves to reduce the wear that occurs on the boot ear about the boot bore, as the interface device tends to act as a sacrificial element that accepts more of the wear that occurs as a result of movement, particularly if the interface device is formed of a material that is less wear resistant or durable than the material forming the base ear.

The insertion step may also include abutting the flange portion 66 of the fastener interface device 60 against the base ear 20, 22. The insertion step may comprise positioning the flange portion 66 between one of the base ears 20, 22, and one of the boot ears 40, 42 such that the flange portion is interposed between the base ear and the boot ear to space the ears away from each other.

The method may also include extending the fastener structure 50 through the fastener interface device or devices 60 to secure the seed boot 30 to the base mount member 12. The step may further comprise passing the fastener structure 50 through the fastener interface devices located in the base bores 26 and through the boot bores 44. In some implementations, the bolt 52 of the fastener structure is inserted through the bores as well as the interface devices 60, and the nut 58 is threaded onto the thread end 55 of the bolt.

Aspects of the method and apparatus of the disclosure reduce the wear that occurs on the boot ear at the base bore by movement of the fastener structure 50 in the boot bore as the seeder apparatus moves through a field and contacts the ground. The insertion portion of the interface device tends to reduce the amount of wear on the boot ear in the boot bore, and the flange portion tends to reduce wear on the face of the base ear by the boot ear, and wear on the boot ear by the base ear, as the adjacent surfaces of these ears would otherwise contact each other and wear as the boot 30 pivoted with respect to the base mount member 12. Further, in those embodiments of the fastener interface device in which the insertion portion 62 has a length that is greater than the thickness of the boot ear, the elements of the fastener structure (such as the head 56 and the nut 58) may be spaced from the surfaces of the boot ears so that the elements of the fastener structure do not contact and wear on the surfaces of the boot ear.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. An air seeder assembly for mounting on a base mount member having a body and at least one base ear extending from the body, the at least one base ear having a base bore formed therethrough, the air seeder assembly comprising:

a seed boot defining a passage through which a seed is able to move into and out of the seed boot, the seed boot comprising a conduit portion defining the passage and at least one boot ear extending from the conduit portion, the at least one boot ear being positionable adjacent to the at least one base ear of the base mount member, the at least one boot ear having a boot bore extending therethrough, the boot bore being alignable with the base bore of the base mount member when the at least one boot ear is positioned adjacent to the at least one base ear;

a fastener interface device inserted into at least one of the boot bores, the fastener interface device comprising:

an insertion portion inserted into the at least one boot bore; and a flange portion positioned adjacent to and extending radially outwardly with respect to the insertion portion, the flange portion being interposable between one of the boot ear and one of the base ears when the seed boot is positioned adjacent to the base mount member.

2. The air seeder assembly of claim 1 additionally comprising a fastener structure extending through the base bore of the at least one base ear and through the fastener interface device.

3. The air seeder assembly of claim 2 additionally comprising a base mount member having a body and at least one base ear extending from the body, the at least one base ear having a base bore formed therethrough, the seed boot being mounted on the base mount member by the fastener structure extending through the base bore of the base mount member and the boot bore of the seed boot.

4. The assembly of claim 3 wherein the base mount member includes a pair of base ears extending from the body in a spaced, substantially parallel arrangement, each base ear having a base bore, the base bores being axially aligned with each other and the fastener structure extending through the base bores.

5. The assembly of claim 3 wherein the seed boot comprises a pair of boot ears extending from the conduit portion in a spaced, substantially parallel arrangement, each boot ear having a boot bore, the boot bores being axially aligned with each other and the fastener structure extending through the base bores.

6. The assembly of claim 3 wherein the base mount member includes a pair of base ears extending from the body in a spaced, substantially parallel arrangement, each base ear having a base bore, the base bores being axially aligned with each other;

wherein the seed boot comprises a pair of boot ears extending from the conduit portion in a spaced, substantially parallel arrangement, each boot ear having a boot bore, the boot bores being axially aligned with each other; and wherein the fastener structure extends through each of the base bores of the base ears and each of the boot bores of the boot ears.

7. The assembly of claim 3 wherein the fastener interface device is configured to permit a degree of pivoting of the seed boot with respect to the base mount member.

8. The assembly of claim 3 wherein the fastener structure comprises:

a bolt extending through the base bores and the boot bores; and a nut removably mounted on the bolt.

9. The air seeder assembly of claim 2 wherein the passage through which the seed is able to move through the seed boot is separate of the at least one boot bore such that the fastener structure in the fastener interface device does not interfere with movement of the seed through the passage.

10. The air seeder assembly of claim 2 wherein the insertion portion has a length from a first end to a second end of the insertion portion, the length of the insertion portion being greater than a depth of the at least one boot bore such that the second end of the insertion portion protrudes from the at least one boot ear when the insertion portion is fully inserted into the at least one boot bore and the fastener structure abuts the protruding insertion portion.

11. The air seeder assembly of claim 1 additionally comprising a base mount member having a body and at least one base ear extending from the body, the at least one base ear having a base bore formed therethrough.

12. The assembly of claim 1 wherein the fastener interface device is inserted into the boot bore of the at least one boot ear.

13. The assembly of claim 1 wherein the insertion portion is substantially tubular.

14. The air seeder assembly of claim 1 wherein the passage through which the seed is able to move through the seed boot is separate of the at least one boot bore such that there is no intersection of the passage and the boot bore.

15. The air seeder assembly of claim 1 wherein the flange portion of the fastener interface device is substantially disc-shaped.

16. The air seeder assembly of claim 1 wherein the flange portion of the fastener interface device has an inner face located adjacent to the insertion portion, the inner face being substantially planar for abutting against a surface of the at least one boot ear located about the boot bore.

17. The air seeder assembly of claim 1 wherein the flange portion of the fastener interface device has an outer face opposite of an inner face located adjacent to the insertion portion, the outer face being substantially planar for abutting against a portion of the at least one base ear of the base mount member.

18. The air seeder assembly of claim 1 wherein the insertion portion has a length from a first end to a second end of the insertion portion, the length of the insertion portion being greater than a depth of the at least one boot bore such that the second end of the insertion portion protrudes from the at least one boot ear when the insertion portion is fully inserted into the at least one boot bore.

19. The air seeder assembly of claim 1 additionally comprising a base mount member having a body and a pair of base ears extending from the body in a spaced, substantially parallel arrangement, each base ear having a base bore, the base bores being axially aligned with each other and the fastener structure extending through the base bores;

wherein the seed boot comprises a pair of boot ears extending from the conduit portion in a spaced, substantially parallel arrangement, each boot ear having a boot bore, the boot bores being axially aligned with each other and the fastener structure extending through the base bores;

wherein one said fastener interface device is inserted into the boot bore of the each boot ear;

a fastener structure extending through the base bores of the pair of base ears and through the fastener interface devices of the boot ears to mount the seed boot on the base mount member;

wherein the insertion portion of each fastener interface device is substantially tubular;

wherein the fastener interface device is configured to permit a degree of pivoting of the seed boot with respect to the base mount member;

wherein the fastener structure comprises a bolt extending through the base bores and the boot bores and a nut removably mounted on the bolt;

wherein the passage through which the seed is able to move through the seed boot is separate of the boot bores such that there is no intersection of the passage and the boot bores and the fastener structure in the fastener interface device does not interfere with movement of the seed through the passage; and wherein the insertion portion has a length from a first end to a second end of the insertion portion, the length of the insertion portion being greater than a depth of the boot bore such that the second end of the insertion portion protrudes from the boot ear when the insertion portion is fully inserted into the boot bore and the fastener structure abuts the protruding insertion portion.

20. The air seeder assembly of claim 19 wherein the flange portion of the fastener interface device is substantially disc-shaped;

wherein the flange portion of the fastener interface device has an inner face located adjacent to the insertion portion, the inner face being substantially planar for abutting against a surface of the boot ear located about the boot bore; and wherein the flange portion of the fastener interface device has an outer face opposite of an inner face located adjacent to the insertion portion, the outer face being substantially planar for abutting against a portion of a respective base ear of the base mount member.

* * * * *